(12) United States Patent
Ramsey et al.

(10) Patent No.: US 9,628,511 B2
(45) Date of Patent: *Apr. 18, 2017

(54) SYSTEM AND METHOD FOR IDENTIFICATION AND BLOCKING OF UNWANTED NETWORK TRAFFIC

(71) Applicant: SECUREWORKS CORP., Wilmington, DE (US)

(72) Inventors: Jon R. Ramsey, Atlanta, GA (US); Wayne Howard Haber, Alpharetta, GA (US); Michael Joseph Hubbard, Sandy Springs, GA (US); Uday Banerjee, Marietta, GA (US)

(73) Assignee: SECUREWORKS CORP., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,867

(22) Filed: Apr. 29, 2016

(65) Prior Publication Data

US 2016/0241591 A1    Aug. 18, 2016

Related U.S. Application Data

(63) Continuation of application No. 14/684,740, filed on Apr. 13, 2015, now Pat. No. 9,338,180, which is a continuation of application No. 12/240,444, filed on Sep. 29, 2008, now Pat. No. 9,009,828.

(60) Provisional application No. 60/995,838, filed on Sep. 28, 2007.

(51) Int. Cl.
*H04L 29/06* (2006.01)
*G06F 15/16* (2006.01)
*G06F 17/30* (2006.01)

(52) U.S. Cl.
CPC .... *H04L 63/1458* (2013.01); *G06F 17/30312* (2013.01); *G06F 17/30528* (2013.01); *H04L 63/02* (2013.01); *H04L 63/1416* (2013.01); *H04L 63/1425* (2013.01); *H04L 63/1441* (2013.01); *H04L 63/1466* (2013.01); *H04L 63/1483* (2013.01)

(58) Field of Classification Search
None
See application file for complete search history.

(56) References Cited

U.S. PATENT DOCUMENTS

| | | | |
|---|---|---|---|
| 6,119,236 A | 9/2000 | Shipley | |
| 6,304,975 B1 | 10/2001 | Shipley | |
| 6,519,703 B1 | 2/2003 | Joyce | |
| 7,200,866 B2 | 4/2007 | Kim et al. | |

(Continued)

*Primary Examiner* — Christopher Revak
(74) *Attorney, Agent, or Firm* — Larson Newman, LLP

(57) ABSTRACT

Network traffic can be prevented from entering a protected network. An alert can be received that can be triggered by network traffic that matches at least one signature that is associated with undesired network behavior. A source of the network traffic that triggered the alert can be determined, and network traffic that originates from the source can be blocked. Blocking the source can include assigning a determination to the alert. It can then be determined whether network traffic from the source should be blocked based on the determination. The source can then be provided to the protected network such that a network device coupled to the protected network can be configured to block network traffic that originates from the source.

16 Claims, 7 Drawing Sheets

(56) References Cited

U.S. PATENT DOCUMENTS

| | | |
|---|---|---|
| 7,213,260 B2 | 5/2007 | Judge |
| 7,418,733 B2 | 8/2008 | Connary et al. |
| 7,424,744 B1 | 9/2008 | Wu et al. |
| 7,493,407 B2 | 2/2009 | Leedom et al. |
| 7,610,624 B1 | 10/2009 | Brothers et al. |
| 7,681,235 B2 | 3/2010 | Chesla et al. |
| 7,757,285 B2 | 7/2010 | Kubota |
| 7,854,001 B1 | 12/2010 | Chen et al. |
| 8,001,244 B2 | 8/2011 | Jacoby et al. |
| 8,056,115 B2 | 11/2011 | Treinen |
| 8,069,471 B2 | 11/2011 | Borren |
| 8,205,259 B2 | 6/2012 | Stute |
| 9,009,828 B1 | 4/2015 | Ramsey et al. |
| 9,338,180 B2 * | 5/2016 | Ramsey .............. H04L 63/1416 |
| 2004/0028000 A1 | 2/2004 | Billhartz |
| 2004/0098618 A1 | 5/2004 | Kim et al. |
| 2005/0138425 A1 * | 6/2005 | Kim ................... H04L 63/1441 726/4 |
| 2005/0262556 A1 | 11/2005 | Waisman et al. |
| 2006/0137009 A1 | 6/2006 | Chesla |
| 2006/0230450 A1 | 10/2006 | Bu et al. |
| 2006/0236392 A1 | 10/2006 | Thomas et al. |
| 2006/0236401 A1 | 10/2006 | Fosdick |
| 2006/0256729 A1 | 11/2006 | Chen et al. |
| 2006/0288413 A1 | 12/2006 | Kubota |
| 2007/0118906 A1 | 5/2007 | Mustafa et al. |
| 2007/0140121 A1 | 6/2007 | Bowman et al. |
| 2007/0140275 A1 | 6/2007 | Bowman et al. |
| 2007/0169194 A1 | 7/2007 | Church et al. |
| 2008/0196103 A1 | 8/2008 | Lin et al. |
| 2011/0099622 A1 | 4/2011 | Lee et al. |
| 2011/0107412 A1 | 5/2011 | Lee et al. |
| 2013/0097706 A1 | 4/2013 | Titonis et al. |

\* cited by examiner

SYSTEM AND METHOD FOR IDENTIFICATION AND BLOCKING OF UNWANTED NETWORK TRAFFIC

CROSS REFERENCE TO RELATED APPLICATIONS

This application is a continuation of U.S. patent application Ser. No. 14/684,740, entitled "System and Method for Identification and Blocking of Unwanted Network Traffic," filed on Apr. 13, 2015 (now U.S. Pat. No. 9,338,180), which is a continuation of U.S. patent application Ser. No. 12/240,444, filed on Sep. 29, 2008, (now U.S. Pat. No. 9,009,828), which claims priority under 35 U.S.C. §119 to U.S. Provisional Patent Application No. 60/995,838, entitled "Attacker Database," filed on Sep. 28, 2007 the disclosures of which are hereby expressly incorporated by reference in their entirety.

FIELD OF THE DISCLOSURE

This invention relates generally to the field of network security, and more specifically to determining sources of undesirable network communications and blocking traffic from those sources.

BACKGROUND

Remote network access has become critical to most businesses. Businesses simply cannot compete without providing email, internet access, and other remote-access services to employees. Furthermore, many businesses provide access to their respective private networks from external locations through virtual private network (VPN) or other secure connections. This remote use of network s has resulted in tremendous improvements in productivity and flexibility. However, these improvements do not come without risk.

Each of these services requires a network to have at least one interface to external communications connections or networks, most often the internet. Any network that provides an interface to the internet is at risk of attack. Attack s can take any number of forms: attempts to gain access to private information, attacks designed to degrade or hamper the performance of the network or devices (such as servers) therein, and attacks to deny external access, to name just a few. A variety of systems exist that operate to thwart these attacks. For example, many networks employ firewalls to prevent unwanted access. Firewalls operate by blocking internet traffic exhibiting certain predefined characteristics, such as traffic that originates from a particular internet address, traffic that attempts to access a particular network port, or traffic that attempts to access a particular destination within the network. Firewalls are advantageous as they characterize and block internet traffic quickly. Conventional firewalls, however, are limited in the scope of the data that can be analyzed and blocked. For example, firewalls are typically limited in that they can only analyze data at the network layer of the TCPIIP protocol stack, and even advanced firewalls allow only limited analysis at the application layer. Furthermore, firewalls rely on advance knowledge by the network administrator of the type of traffic that should be blocked.

To improve security, some networks add devices known as an intrusion-detection or intrusion-prevention system (referred to collectively herein as an IDS) to make up for some of the failings of a firewall. IDSs are conventionally installed just behind the firewall, and are used to provide further analysis of traffic that is not blocked by the firewall. IDSs typically provide more expansive analysis of incoming traffic (in comparison to a firewall), can often analyze traffic across connections, and can identify traffic from disparate addresses that may be a part of a single attack, such as a distributed denial-of-service attack. Conventional IDSs are also capable of analyzing data on all layers of the network protocol stack. This enhanced functionality is not without cost, however.

To obtain the full benefit of IDSs, IDSs are conventionally installed inline with the firewall in order to be able to block unwanted traffic. Because the additional analysis takes time, the use of an IDS can significantly slow network traffic. IDSs can also be complex, requiring an increased level of expertise for a company's information technology (IT) staff. Furthermore, IDSs can be expensive, not only in the cost of hiring IT staff, consultants, or other service providers with the appropriate expertise, but also in purchasing, implementing, and managing the equipment and software required to support the IDS. Additionally, because poor monitoring of an IDS yields little benefit to the protected network, a much higher level of monitoring activity must take place in a network that employs an IDS, further increasing the cost of the system. For these and other reasons, many companies that would otherwise benefit from an IDS may not install one, thus leaving their network insufficiently protected.

A second problem with existing IDS and firewall technology is that IDSs and firewalls are typically only aware of attacks on the network in which they are installed. Network attacks are rarely performed on a large number of network s at the same time. Accordingly, as one network experiences a new type of attack, other networks cannot protect themselves from the attack unless a network administrator recognizes the attack and publishes the characteristics of the attack—accurately and in sufficient detail—so that other network administrators can configure their firewall s and IDSs to recognize and defend against the new type of attack.

A third problem with conventional IDSs is that they are only capable of blocking known attacks. Specifically, conventional IDSs operate by matching aspects of network traffic with signatures that have been determined to be indicative of a particular attack. Accordingly, IDSs cannot block an attack until that attack has been both launched against at least one network and analyzed by security analysts who generate a signature for that attack. Thus, even the most diligent efforts of network security analysts cannot provide conventional IDSs with the capability to block new attacks.

Accordingly, a need exists for a network protection system that is capable of providing the benefits of an IDS to a network that does not deploy such a system. A need also exists for a network protection system that is capable of receiving updated information identifying attacks that occur on other networks so that the network protection system can prepare for the attack before it occurs. Yet a further need exists for a network protection system that can provide protection against new attacks for which attack signatures have not yet been generated.

BRIEF SUMMARY

The present invention can satisfy the above-identified needs by providing a system and method for the identification and blocking of unwanted network traffic. In one aspect of the invention, an alert is received, wherein the alert can be triggered by network traffic that matches at least one signature that is associated with undesired network behavior. The source of the network traffic that triggered the alert can be determined. Network traffic that originates from the source can then be blocked, wherein blocking can include assigning a determination to the alert, and determining that network traffic from the source should be blocked based on the determination. The source can then be blocked by providing the address of the source to the protected network such that a network device coupled to the protected network can be configured to block network traffic that originates from the source. The address of the source can also be used in the generation of additional signatures, for example, by providing the address to an analyst. The address of the source can also be used in assigning determinations to subsequent alerts. The address of the source can be provided to a second protected network. The address of the source can also be provided to a network device that did not generate the alert.

Additionally, the network traffic can be blocked by establishing a predetermined alert threshold indicative of a source that should be blocked and determining that network traffic from the source should be b locked if the number of alerts associated with the source exceeds the alert threshold. If the number of alerts associated with the source exceed the alert threshold, the address of the source can be provided to an analyst, where in the analyst determines whether the source should be blocked. The alert threshold can be at least one of a predetermined number of matched signatures, a predetermined number of target devices, and a predetermined period of time. The predetermined threshold can be reduced in response to determining that the country of origin of the source is commonly associated with unwanted network traffic. The predetermined threshold can also be reduced if the total number of alerts associated with the source exceeds a predetermined value.

The determination assigned to the alert can include at least one of a reconnaissance alert, a global attack, a targeted attack, benign, and a false positive. The alert can be assigned a determination by an analyst. The alert can also be assigned a determination automatically without intervention by an analyst. The alert can be a group of alerts having similar characteristics, wherein the similar characteristics are at least one of: a source address, a destination address, a signature, and a time period.

In another aspect of the invention, a system for identifying and blocking network traffic is provided. The system can include an alert analysis facility for receiving one or more alerts associated with network traffic that has a source. The alert analysis facility can assign a determination to the alerts. An engine can be configured to receive alerts from the alert analysis facility. The engine can analyze the alerts to determine whether further network traffic originating from the source should be blocked. A database can be configured to receive and store an address of one or more sources upon a determination by the engine that network traffic originating from the source should be blocked. The alert analysis facility can be configured to receive the addresses stored in the database for use in analyzing alerts.

In this aspect of the invention, the system can include a facility for distributing the databases to at least one customer. The system can also include a signature generation facility for generating signatures for identifying network attacks. The signature generation facility can receive the addresses stored in the database for use in the generation of signatures. The system can also include an intrusion detection system configured to receive network traffic and signatures from the signature generation facility, wherein the intrusion detection system transmits the alert to the alert analysis facility when the network traffic matches at least one of the signatures.

Additional aspects, objects, features, and advantages of the invention will become apparent to those having ordinary skill in the art upon consideration of the following detailed description of exemplary embodiments. For a more complete understanding of the exemplary embodiments of the present invention and the advantages thereof, reference is now made to the following description in conjunction with the accompanying drawings described below.

DETAILED DESCRIPTION OF THE DRAWINGS

Figure 1:
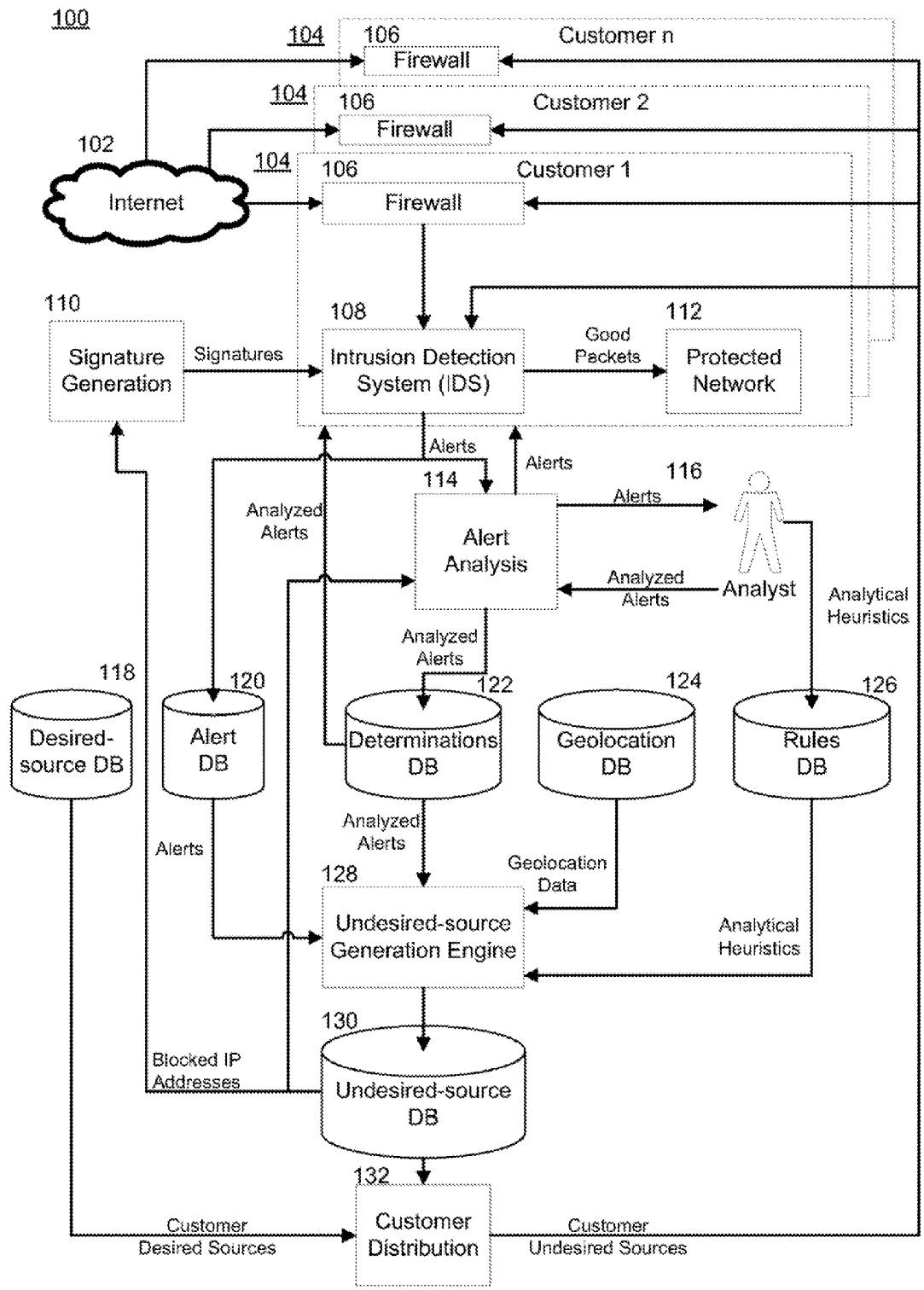
FIG. 1 is a block diagram depicting a representative network protection system according to an exemplary embodiment of the present invention.

The inventive network protection system can determine, based on signatures of attacks, whether network traffic is indicative of an attack. The network protection system can generate alerts indicating that network traffic is indicative of an attack. The alerts can then be transmitted to an alert analysis system where the alerts can be flagged with a determination of whether the alert represents reconnaissance, a global attack, a targeted attack, a false positive, or if the alert is benign.

The alert analysis system can automatically (without the assistance of an analyst) flag an alert with a determination. Alternatively, however, the alert analysis system can transmit the alert to a trained analyst who can flag the alert with a determination. Flagged alerts can then be analyzed using heuristics to determine whether the alerts indicate that the source of the traffic that spawned the alert should be blocked from communicating with a protected network. The determination of whether the source of the traffic should be blocked can be based on the volume of alerts received from the source, the volume of alerts that were generated based on a particular signature, the volume of alerts that re late to a particular target, whether the source has engaged in extensive reconnaissance activity, the geographic source of the traffic, or any combination thereof. The determination of whether the source should be blocked can also be based on other information relating to the alerts, as would be understood by one of ordinary skill in the art.

Once it is determined that the source of the traffic should be blocked from communicating with a protected network, the source address can be added to an undesired-source database. The undesired-source database can be customized based on individualized desired-source databases generated by customers. The customized undesired-source databases can then be transmitted to customers operating protected networks. The customers can then use the undesired-source databases to block unwanted traffic. The customers who receive the undesired-source databases need not be the customers that generated the alerts at the outset, thus allowing all customers of the network protection system to receive the benefit of a small number of customers identifying a potential attack. Further, the customers receiving the undesired-source databases need not implement IDSs, as the undesired-source database can be loaded onto a firewall. Accordingly, customers who cannot (or choose not to) implement an IDS may still receive some benefits that are typically provided only by IDSs.

The customized undesired-source databases can also be fed back to the network that initially received the unwanted traffic, as will be elaborated in greater detail in the following paragraphs. Additionally, the source address of the unwanted traffic can be fed back to a signature generation facility and used to generate new attack signatures. Further, the source address of the unwanted traffic can be fed back to the alert analysis system to assist in the analysis of further alerts. In all cases, the undesired-source database can be fed back to trained analysts who can use the undesired-source database as an additional data source to consider while analyzing internet traffic in search for clues as to how to identify future attacks.

Turning now to the drawings, in which like reference numerals refer to like elements, FIG. 1 is a block diagram depicting a representative network protection system 100 according to an exemplary embodiment of the present invention. One or more customers 104 receive network traffic from the internet 102. In an exemplary embodiment, each customer 104 employs at least a firewall 106 to protect a protected network 112. In an alternative exemplary embodiment, the customer 104 may employ another device having the capability of blocking traffic from entering the protected network 112, such as a proxy. The network traffic passes into the firewall 106 which is configured to drop (or block) traffic that meets certain predetermined criteria.

In an exemplary embodiment, the predetermined criteria include, but are not limited to, the source internet protocol (IP) address of the traffic, the destination IP address of the traffic, the port upon which the traffic is attempting to communicate, or other characteristics of the traffic. The source IP addresses to be blocked may be programmed by the network administrator (or other person or entity responsible for administration, monitoring, or management of network assets). Additionally, in an exemplary embodiment of the present invention, the source IP addresses to be blocked may be transmitted to the firewall 106 by an external network protection system. The process of determining the IP addresses to be blocked and transmitting the IP addresses to the firewall 106 will be described in further detail below.

The traffic that passes through the firewall 106 passes into an intrusion detection system 108 (IDS). In an exemplary embodiment, the IDS 108 is installed inline between the firewall 106 and the protected network 112 such that all traffic that passes through the firewall 106 is analyzed by the IDS 108 prior to reaching the protected network 112. In an alternative exemplary embodiment, the IDS 108 is installed in parallel with the firewall 106, such that network traffic passes into the protected network 112 while it is still under analysis by the IDS 108. In another alternative exemplary embodiment, the IDS 108 can be installed in other locations in the network, including in front of the firewall 106, such that the IDS 108 can analyze all network traffic before any portion of the traffic is dropped by the firewall 106.

The IDS 108 can be configured to perform additional analysis of the network traffic to identify potential attacks. To identify potential attacks, the IDS 108 compares the network traffic to a set of attack signatures. The attack signatures are generated by a signature generation facility 110. Using the attack signatures, the IDSs 108 is capable of analyzing traffic at all of the Open Systems Interconnection (OSI) network layers that are visible to the customer network. In an exemplary embodiment, the IDS 108 can analyze traffic at OSI layers 3-7. The capability of analyzing traffic for signatures at multiple layers is advantageous in that not all network attacks can be detected in a single layer. For example, many known attacks, such as viruses attached to or embedded in an email message or World Wide Web ("Web") traffic occur on OSI layer 7 (the "application" layer). Many attacks, however, occur on intermediate layers, and therefore would not be detected by a device scanning for signatures only on the application layer. For example, a "Man-In-The-Middle" attack, wherein a malicious computer inserts itself between the source and the target of an otherwise legitimate network session and intercepts the network traffic. Such traffic on the application layer does not carry an indication of such an attack. However, the session layer (layer 5), which controls sessions between computers, may carry the signature of a Man-In-The-Middle attack. Similarly, buffer overflow attacks directed at the internal devices on a network (such as a Web server) generally can only be detected on the presentation layer (layer 6). Accordingly, the ability to scan for attacks on all of the relevant OSI layers allows the IDS 108 to provide more comprehensive network protection.

In an exemplary embodiment, the attack signatures are developed by trained analysts associated with the signature generation facility 110 who are aware of the methods and techniques used by hackers, and are capable of recognizing patterns in traffic that arc indicative of attacks. In an alternative exemplary embodiment, attack signatures may be obtained from third parties, such as network security companies, universities, or other parties that generate attack signatures. In yet another alternative exemplary embodiment, attack signatures may be generated automatically. For example, attack signatures may be generated automatically using a computer system to seek patterns in traffic that has been identified as undesired.

When network traffic matches at least one signature, the IDS 108 generates an alert that indicates the match. In an exemplary embodiment, the alert includes information relating to the traffic and the signature. The information includes, but is not limited to, the time of the alert, the signature that triggered the alert, the source and target of the traffic that triggered the alert, and may include any other information relating to the network traffic, as would be understood by one of ordinary skill in the art.

The IDS 108 is configured to allow network traffic that does not trigger any alerts to pass through to the protected network 112. In an exemplary embodiment, the IDS 108 performs one of two actions with regard to traffic that triggers an alert. First, the IDS 108 can drop the traffic, preventing the traffic from accessing the protected network 112. Second, the IDS 108 can allow the traffic to pass despite having generated an alert, allowing the traffic to access the protected network 112. This decision can be made based on the signature, i.e., traffic matching certain signatures is dropped, while traffic matching other signatures is allowed to pass. Regard less of whether the traffic is allowed to pass to the protected network 112, the alert is passed to an alert analysis facility 114 for further analysis.

The alert analysis facility 114 can be located either within the protected network 112, or in an exemplary embodiment of the present invention, at a location remote to the protected network 112. The alert analysis facility 114 can receive alerts from a large number of geographically diverse customers 104. The alert analysis facility 114 can include a computer system that is used to group the alerts. There may be one or more alerts in a group. Grouping of alerts provides an additional level of analysis that may not be possible at the IDS 108, and follows one or more grouping rules. For example, the alert analysis facility 114 may group alerts that are generated from the same signature, alerts that arc generated by the same IDS 108, alerts that arc generated within a predetermined period of time (e.g., all alerts generated within a ten-minute period), alerts that are generated by the same customer 104, alerts that are generated by the same source address, or are directed at the same target address, some combination thereof, or any other information associated with the alert that can be used to categorize the alert, as would be recognized by one of ordinary skill in the art.

Once the alerts have been grouped, the alert analysis facility 114 analyzes and assigns a determination to each alert group. The determination indicates the threat level or type of attack that is associated with the alert group. In an exemplary embodiment, the determination is based on the signature and/or the number and nature of targeted systems (i.e., whether the traffic that triggered the alerts forming the group was directed at a large number of different systems). If the alert group indicates a concentrated attack on a small number of systems, the alert group is flagged with a "targeted attack" determination. If the alert group indicates a distributed attack on a large number of systems, the alert group is flagged with a "global attack" determination. If the alert group is indicative of activity that is not an attack, or is not an attack that can compromise the network, the alert group is flagged with a "benign" determination. However, if an alert group that would normally be flagged as benign includes a large amount of suspicious traffic that might indicate that a hacker is attempting to find vulnerabilities in the protected network 112, the alert group may be flagged with a "reconnaissance" determination. If an alert group arises from a signature that is known to create false positive alerts, and does not exhibit the characteristics associated with one of the other determinations, the alert group is flagged with a "false positive" determination. If a customer 104 has determined that an alert group is not an attack despite being otherwise indicative of one of the other statuses, then the alert group is flagged with a "customer opt-out" determination.

In certain circumstances, the alert analysis facility 114 may not be able to make a determination as to a given alert group. In other circumstances, analysts may wish to further analyze an alert group. In either case, the alerts are transmitted to an analyst 116 for analysis and a determination. In an exemplary embodiment, the signature associated with the alert will indicate whether the alert should be transmitted to an analyst 116 for a determination.

The exemplary analyst 116 is an individual or group of individuals having training in network security, and having experience in recognizing attacks. In an exemplary embodiment, the analyst 116 is disposed at a location remote to the protected network 112, and can receive and analyze alerts from one or more remote protected networks 112. In an alternative exemplary embodiment, the analyst can be disposed at the location of the protected network 112, or at a location of the customer 104 associated with the protected network 112, such that alerts transmitted to the analyst 116 need not leave the protected network 112 for analysis. The analyst 116 may be a network administrator, or may be another individual or group of individuals who are responsible for administering network devices within the protected network 112. In either embodiment, the analyst 116 makes a determination from the same set of determinations available to the alert analysis facility 114. An analyst's 116 determination trumps a determination made by the alert analysis facility 114.

Once an alert group has been flagged with a determination, the determination is stored in a determination s database 122. The determinations database 122 stores determinations for further analysis. The determination s are retrieved from the determinations database 122 by the undesired-source database generation engine 128. The determinations may also be transmitted back to the customer 104.

The undesired-source database generation engine 128 uses information from the flagged alert groups to generate an undesired-source database 130 containing IP addresses of sources known to send harmful or unwanted network traffic that can be used by firewalls 106 or other network protection devices to block unwanted network traffic. In an exemplary embodiment, the undesired-source database generation engine 128 does not analyze alerts that are flagged either as benign, false positive, or customer opt-out, as those alerts generally are not indicative of a source IP address that should be added to the undesired-source database 130.

In an exemplary embodiment, the undesired-source database generation engine 128 accesses a rules database 126 to assist in creation of the undesired-source database. The rules database 126 contains a set of analytical heuristics that the undesired-source database generation engine 128 can apply to the determinations to determine whether the source of the traffic that led to the alert is a sufficiently bad actor such that all traffic from that address should be blocked. In an exemplary embodiment, the heuristics in the rules database 126 are created by an analyst 116 who has access to large repositories of data. The analyst 116 can use the data to determine parameters that are indicative of a particular IP address that should be blocked based on the amount of undesirable traffic it sends out.

The heuristics in the rules database 126 may be constantly analyzed and updated to provide the best balance between strong protection and the risk of blocking legitimate traffic. A undesired-source database 130, can be a severe form of protection—once in place, no traffic is allowed to pass into a network from the blocked addresses. Accordingly, great pains must be taken to avoid placing IP addresses in the undesired-source database 130 that should not be listed.

Accordingly, in an exemplary embodiment, the rules database 126 includes rules that filter alerts that have been designated as being indicative of undesirable traffic, yet should not be block ed. For example, all alerts that are triggered by traffic on certain ports that commonly carry a mix of both legitimate and illegitimate traffic can be filtered. These ports include, but are not limited to port 110, which is typically used for Post Office Protocol (POP) transmissions and port 25, which is typically used for Simple Mail Transfer Protocol (SMTP) communications. POP and SMTP traffic is not blocked because it typically carries electronic mail messages. Electronic mail messages frequently cause alerts if they carry unwanted data, such as viruses attached to or embedded in an email message. However, in most cases the traffic causing those alerts is not under the control of the owner of the IP address. Rather, this traffic might result from a "zombie," "worm," or other type of attack that uses a server at the particular IP address without knowledge of the server owner to send unwanted email traffic. Blocking an IP address that is the victim of such an attack may result in desired traffic being blocked as well, and accordingly, alerts triggered by SMTP and POP communications are not considered by the undesired-source database generation engine 128.

Similarly, certain alerts may be triggered by traffic from a "spoofed" IP address. Address spoofing is a process where in the true IP address of the sender is replaced with a false, albeit often legitimate, IP address. Certain signatures are associated with attacks that are known to use spoofed IP addresses. For example, the SQL Slammer worm (well known to those of ordinary skill in the art), which infected at least 75,000 computers in approximately ten minutes in 2003, always spoofs the source IP address. Accordingly, alerts triggered by a signature that was designed to identify the SQL Slammer worm will not be considered by the undesired-source database generation engine 128. By a similar token, the undesired-source database generation engine 128 will not consider alerts triggered by Universal Datagram Protocol (UDP) traffic. UDP transfers do not require a hand shake between the communicating computers (as is required by TCP communications). Accordingly, UDP traffic can include a spoofed source IP address and still be delivered. Because UDP traffic is so prone to spoofing, alerts caused by UDP traffic are not considered by the undesired-source database generation engine 128.

Additionally, an analyst 116 may determine that a particular signature is not sufficiently reliable such that alerts created by the signature should trigger addition of the source IP to the undesired-source database. In this instance, the analyst 116 can add a rule to the rules database 126 that filters out all determinations regarding alerts generated by traffic matching the suspect signature. Thus, the undesired-source database generation engine 128 will not consider those alerts when determining whether a particular source IP address should be added to the undesired-source database 130, unless expressly directed to do so.

Once the determinations in the determinations database 122 have been filtered to exclude alerts that should not trigger the addition of a particular source IP address to the undesired-source database based on rules in the rules database 126, heuristics are applied to the remaining determinations (and their associated alerts, which are stored in the alert database 120) to determine whether the source IP address associated with those alerts should be added to the undesired-source database 130. First, the heuristics include a baseline rule that, if the number and type of alerts originating from a particular source IP address exceed a certain predetermined value, that IP address will be added to the undesired-source database. By way of example only, if the alerts associated with the determinations in the determinations. database 122 indicate that a particular source IP sent traffic to at least ten different devices that triggered alerts associated with at least ten different signatures over a one-day period, the source IP address will be added to the undesired-source database. This baseline heuristic is merely exemplary, and can be modified to add a source IP address to the undesired-source database based on any combination of the number of alerts, the number of devices attacked, the number of signatures, and the period of time over which the alerts are tracked. Furthermore, one or more of the factors can be removed from the calculation. Additionally, one of ordinary skill in the art would recognize that additional factors can also be added to the baseline heuristic. If it is determined, by an analyst 116 or otherwise, that an undesirable number of OP addresses are being added to the undesired-source database as a result of the baseline heuristic, the factors can be adjusted until the IP addresses in the undesired-source database are fairly representative of the IP addresses that should be blocked.

When determining whether a source IP address should be added to the undesired-source database 130, the undesired-source database generation engine 128 may consider other information about the source IP address. In certain situations, the undesired-source database generation engine 128 can make the baseline heuristic more or less stringent depending on additional information relating to the alert. In an exemplary embodiment, the undesired-source database generation engine 128 receives geolocation data from a geolocation database 124 to determine the country of origin of the traffic. If the country of origin is considered to be a common source of unwanted traffic, then the stringency of the baseline heuristic can be modified such that fewer alerts will trigger the addition of the source IP address to the undesired-source database. By way of example only, and in light of the exemplary baseline heuristic provided above, if the traffic originated from a country that is a common source of unwanted traffic. the source IP of the traffic may be added to the undesired-source database 130 after triggering alerts associated with two signatures against two devices (wherein the devices may be on a single protected network, or spread over disparate protected networks) over a one-day period. The countries that are determined to be a common source of unwanted traffic arc those that arc known to those in the industry to be a significant source of internet attacks. By way of example only, those countries may include, but are not limited to, Russia, South Korea, Afghanistan, and Brazil, which, as of the filing date of this application, are sources of a significant amount of bad traffic. The countries that are determined to be a common source of unwanted traffic may also include countries that have been designated as such by governmental or other entities. However, the countries indicated as being common sources of unwanted traffic can change frequently, as is known to those of ordinary skill in the art.

Further, when determining whether to add the source of an alert to the undesired-source database 130, the undesired-source database generation engine 128 can consider whether the source IP has generated a large number of reconnaissance alerts. As discussed above, the alert analysis facility 114 and/or the analyst 116 can determine whether a particular alert is indicative of reconnaissance activity, and can flag the alert accordingly. Because reconnaissance is often a benign activity, sources of reconnaissance activity are typically not added to the undesired-source database 130 simply on the basis of the reconnaissance activity. Reconnaissance activity often does, however, lead to more objectionable attacks, which should be blocked. Accordingly. in an exemplary embodiment of the present invention, when a source IP address is associated with a predetermined number of reconnaissance alerts, then a lower number of non-reconnaissance alerts from that IP address can result in the addition of that source IP address to the undesired-source database 130. By way of example only, and in light of the exemplary baseline heuristic provided above, if a particular source IP address is associated with five reconnaissance alerts over one day, then the baseline may be reduced such that an alert triggered on a single device with three signatures over one day may result in addition of the source IP to the undesired-source database 130.

Additionally, the undesired-source database generation engine 128 can increase the stringency of the baseline heuristic based on the volume of alerts that are associated with a particular source IP address. For example, all alerts are stored in the alert database 120. Further, as described above, the undesired-source database generation engine 128 generally does not consider alerts that have been flagged as false positive or benign. However, in some cases, even a source IP address that generates a tremendous number of otherwise benign alerts may need to be added to the undesired-source database 130. Accordingly, if data in the alert database 120 indicates that a very large number of alerts have been triggered by data from a single source IP address, the stringency of the baseline heuristic can be increased for that source IP address. By way of example only, and in light of the exemplary baseline heuristic provided above, if more than one-hundred alerts in the alert database 120 are associated with a particular source IP address, then the baseline heuristic may be reduced such that alerts associated with three signatures and two different devices over the course of two days may result in the addition of the source IP address to the undesired-source database 130.

In an alternative exemplary embodiment, the source IP address may be reviewed by an analyst 116 before it is added to the undesired-source database 130. In this embodiment, once it is determined, as described above, that a source address should be added to the undesired-source database 130, the source address to be added is transmitted to an analyst 116 for a final determination of whether the source address should be added, thus adding an additional check as to whether a source address should be added.

Once a source IP address has been added to the undesired-source database 130, it may also be removed from the undesired-source database upon fulfillment of certain conditions. In an exemplary embodiment, a source IP address is automatically removed from the undesired-source database seven days after being added. In alternative exemplary embodiments the period for which the source IP remains in the undesired-source database can be variable, and can be increased or decreased based on any number of factors, such as, but not limited to, the number of times the source IP address has previously been in the undesired-source database, the severity of the alerts that led to the source IP address being added to the undesired-source database, or the discretion of an analyst 116.

Once the undesired-source database generation engine 128 has determined that a source IP address should be added to the undesired-source database 130, the source IP address is added to the undesired-source database 130. The undesired-source database 130 stores all source IP addresses that should be prevented from entering a protected network 112. One of ordinary skill in the art would recognize that the undesired-source database 130 operates as a "blacklist" as to those addresses stored therein, as traffic from those addresses will be prevented from accessing any protected network 112 that employs the undesired-source database 130 at a firewall 106 or other network appliance. IP addresses in the undesired-source database 130 can be fed back to the signature generation facility 110 to assist analysts in creating attack signatures. IP addresses in the undesired-source database 130 can also be fed back to the alert analysis facility 114 to assist in both the analysis of future alerts, and in the creation of additional rules and heuristics for analyzing alerts and determinations.

Finally, individualized undesired-source databases are generated for each customer 104. Each customer 104 may create an individual desired-source database. Each customer desired-source database is a list of IP addresses that the customer 104 wants to ensure are allowed access to the customer's protected network 112. Customers 104 can create multiple desired-source databases that represent: different sets of addresses that should be allowed to access different network devices under the customer's 104 control. For each customer 104 that is to receive an undesired-source database, any IP addresses that appear on both the customer's desired-source database and in the undesired-source database 130 are not sent to the customer 104. Once each individualized undesired-source database is generated, it is transmitted to a customer 104, where the customer's firewall 106 is configured to block traffic from IP addresses appearing on the individualized undesired-source database.

The undesired-source database 130 provides the customers with numerous benefits. First, because the undesired-source database 130 can be generated based on attacks that have been experienced by numerous networks, and then can be distributed to customers 104 that have not necessarily experienced the same attack, the protected network 112 of each customer 104 can be protected from attacks originating from the same source, even though the attack was only launched against a single network. Second, as described in detail above, the undesired-source database 130 includes addresses of known sources of undesired traffic. As would be understood by one of ordinary skill in the art, attacks are often launched from the same source over an extended period of time. These attacks often include new attacks that do not yet have signatures that will allow an IDS 108 to protect a network against the attack. Accordingly, by blocking known sources of unwanted traffic, many new attacks will be thwarted even before signatures identifying those attacks are developed. Third, because the undesired-source database can be deployed by network devices such as firewalls 106, customers 104 who do not have an IDS 108 installed receive some of the benefit of IDS 108 installed in other customers' 104 networks.

Figure 2:
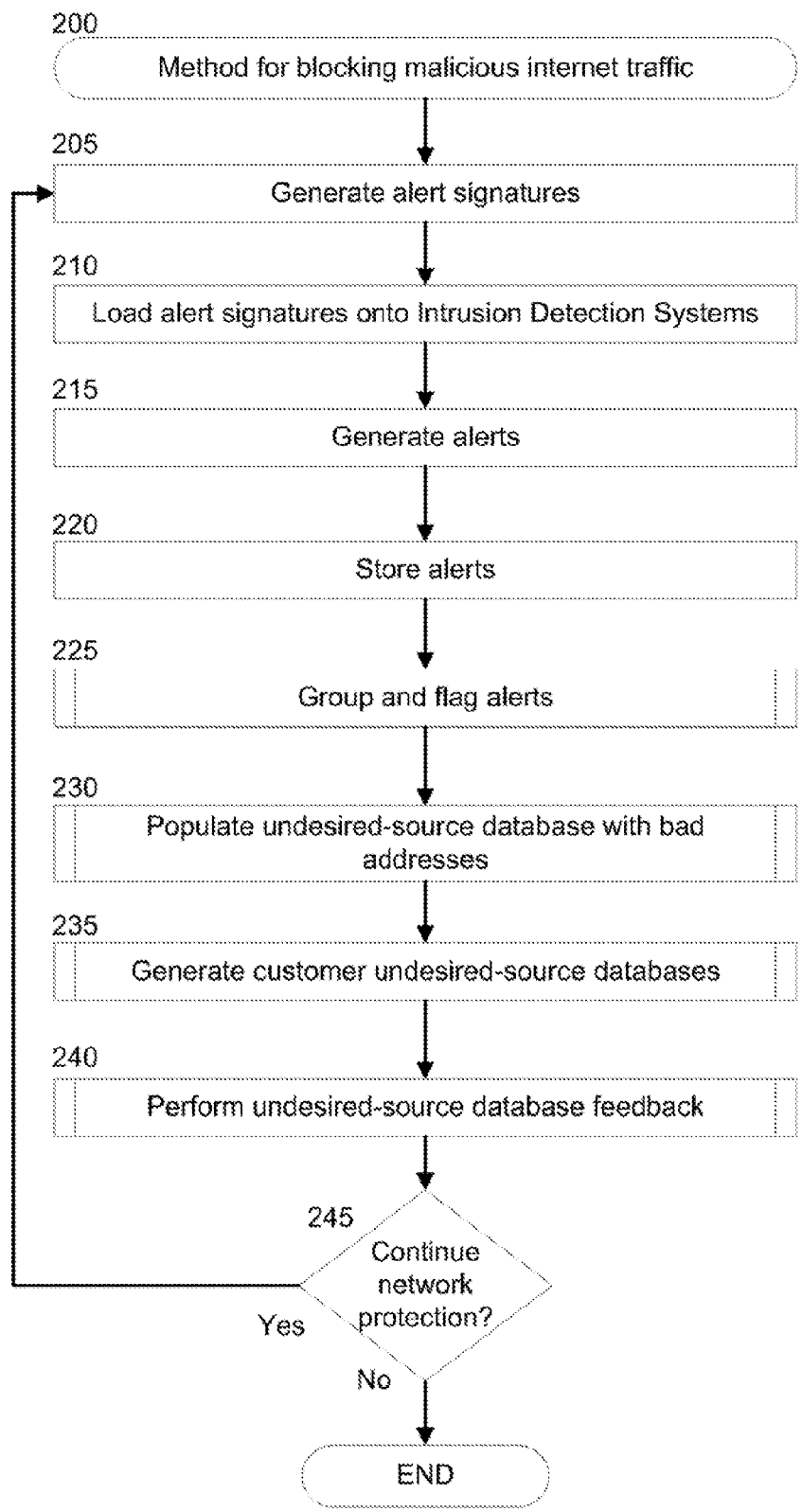
FIG. 2 is a flow chart depicting an exemplary method for using the network protection system of FIG. 1 to block malicious internet traffic.

Referring now to FIG. 2, which is a flow chart depicting an exemplary method for using the network protection system 100 of FIG. 1 to block malicious internet traffic according to an exemplary embodiment of the invention, a method for blocking malicious internet traffic will be described. FIG. 2 will be discussed with reference to FIG. 1. Method 200 highlights some key functional features of the network protection system 100.

One of ordinary skill in the art will appreciate that process functions or steps performed by the network protection system 100 may comprise firmware code executing on a microcontroller or microprocessor; state machines implemented in application specific or programmable logic; or numerous other forms without departing from the spirit and scope of the invention. In other words, the invention may be provided as a computer program which may include a machine-readable medium having stored thereon instructions which may be used to program a computer (or other electronic devices) to perform a process according to the invention.

The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Certain steps in the methods described in all of the logic flow diagrams referred to below must naturally precede others for the invention to function as described. However, the invention is not limited to the order of the steps described if such order or sequence does not alter the functionality of the present invention. That is, it is recognized that some steps may be performed before, after, or in parallel other steps without departing from the scope and spirit of the present invention.

Additionally, it is recognized that certain steps could be re-arranged m different sequences or entirely deleted without deviating from the scope and spirit of the invention. In other words, it is recognized that the steps illustrated in the flow charts represent one way of achieving a desired result of protecting a network. Other ways which may include additional, different steps or the elimination of steps, or the combination of eliminating steps and adding different steps will be apparent to one of ordinary skill in the art.

Further, one of ordinary skill in programming would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Referring again to FIG. 2, step 205 is the first step of the method 200 in which alert signatures are generated. In step 210, the alert signatures are loaded onto IDSs 108. In step 215, the IDSs 108 generate alerts. As described above, alerts are generated by comparing network traffic to the signatures. When the network traffic matches a signature, an alert is generated. The alert includes information identifying the signature that was matched, the source IP address of the traffic, the destination IP address of the traffic, and the time the alert occurred. In step 220, alerts are stored in the alert database 120.

In step 225, alerts are transmitted to the alert analysis facility 114, where they are grouped, analyzed, and flagged with a determination. The process of grouping and flagging alerts will be discussed in further detail with respect to FIG. 3. In Step 230, the undesired-source database 130 is populated with bad addresses. The process of populating the undesired-source database 130 with bad addresses is discussed in further detail with respect to FIG. 4. In step 235, customer undesired-source databases are generated. The process of generating customer undesired-source databases is described in further detail with respect to FIG. 6. In step 240, the undesired-source databases are fed back to the signature generation facility 110 and the alert analysis facility 114. The feedback process of step 240 is described in further detail with respect to FIG. 7. In decision step 245, it is determined whether the network protection system 100 is to continue operations. If the inquiry in decision step 245 is positive, then the "Yes" branch is followed to step 205. If, on the other hand, the inquiry in decision step 245 is negative, then the method ends.

Figure 3:
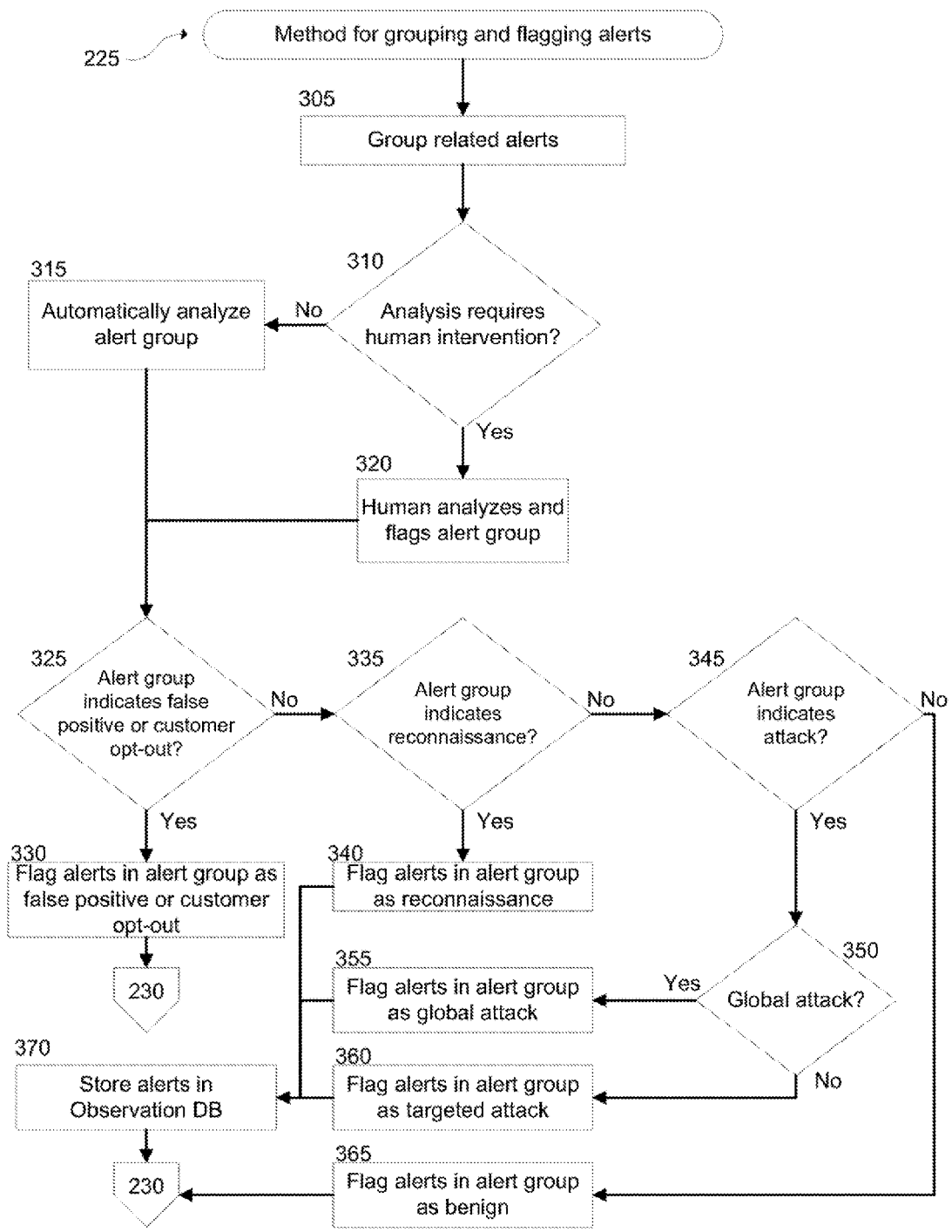
FIG. 3 is a flow chart depicting an exemplary method for observing and flagging alerts using the network protect ion system of FIG. 1.

Referring now to FIG. 3, a method 225 for grouping and flagging alerts is described. FIG. 3 will be discussed with reference to FIGS. 1 and 2. In step 305, related alerts are grouped. Alerts may be grouped on any of an alert's characteristics, including, for example, the signature that resulted in the triggering, the time period over which the alerts occurred, the source IP address of the traffic that triggered the alert, and the destination of the traffic. In an exemplary embodiment, alerts are grouped based on the signature that triggered it.

In decision step 310, the alert analysis facility 114 determines if the alert group requires human intervention to flag the alert with a determination. In an exemplary embodiment, am alert group associated with a signature that has been triggered for the first time may require human intervention. In alternative exemplary embodiments, if an analyst 116 has determined that alerts triggered by a particular signature should not be automatically analyzed, or if a customer 104 has requested that alerts triggered by a particular signature be sent directly back to the customer 104, then the alert may not be analyzed. If it is determined that analysis by an analyst 116 is not necessary, then the "No" branch is followed to step 315, wherein the alert group is automatically analyzed—and a determination assigned thereto—by the alert analysis facility 114. The method then proceeds to step 325.

If, on the other hand, it is determined in step 310 that an analyst 116 should be involved in making the determination, then the "Yes, branch is followed to step 320, wherein an analyst 116 examines the alert group and assigns a determination thereto. The method then proceed s to step 325.

In decision step 325, it is determined whether the alert group indicates a false positive. In an exemplary embodiment, an alert group is indicative of a false positive if it is determined that the signature that gave rise to the alerts in the group tends to be triggered by traffic that is not indicative of an attack. This determination can be made by analysts 116 after reviewing logged alerts and the traffic associated with those alerts. If it is determined in decision step 325 that the alert group is indicative of a false positive, then the "Yes" branch is followed to step 330, wherein the alerts are flagged with a false positive determination. The process then proceeds to step 230 of FIG. 2.

Referring again to decision step 325, if the alert group is not indicative of a false positive, then the "No" branch is followed to decision step 335, wherein it is determined whether the alert is indicative of reconnaissance activity. By way of example only, reconnaissance activity includes activities such as port scanning, wherein a source address attempts to access a target address at multiple ports, port sweeping, wherein a source addresses attempts to access the same port over a number of target addresses, or port flooding, which combines the two activities. In an exemplary embodiment, reconnaissance activity alone does not result in the addition of a particular source IP address to the undesired-source database, but, as described above with respect to FIG. 1, a predetermined number of reconnaissance alerts associated with a particular source IP address can result in increased scrutiny (in the form of more stringent heuristics) being applied to alerts from the source IP address. If it is determined that the alert group is indicative of reconnaissance activity, then the "Yes" branch is followed to step 340, wherein the alert is flagged with a reconnaissance determination. The method then proceeds to step 230 of FIG. 2.

Referring again to decision step 335, if it is determined that the alert group is not indicative of reconnaissance activity, then the "No" branch is followed to decision step 345, wherein it is determined whether the alert group is indicative of an attack. In an exemplary embodiment, an alert group is indicative of an attack if the collection of signatures that generated the alerts have been determined to be indicative of an attack. In an exemplary embodiment, the determination of whether a group of signatures is indicative of an attack may be made by an analyst 116. If the inquiry is positive, then the "Yes" branch is followed to decision step 350, where in it is determined whether the alert indicates a global attack. In an exemplary embodiment, the alert group indicates a global attack if the group of alerts indicates that traffic matching the signature has been received by a large number of customers 104. Similarly, the alert is indicative of a targeted attack if the offending traffic has been received by only one (or a small number) of customers 104. If it is determined that the attack is a global attack, then the "Yes" branch is followed to step 355, wherein the alerts are flagged with a global attack determination. The method then proceed s to step 370, wherein the determination is stored in the determinations database 122. Referring again to decision step 350, if it is determined that the attack is a targeted attack, the "No" branch is followed to step 360, wherein the alerts are flagged with a targeted attack determination. The method then proceeds to step 370, wherein the determination is stored in the determinations database 122. From step 370, the method then proceeds to step 230 of FIG. 2.

Referring again to decision step 345, wherein it is determined whether the alert indicates an attack. If the inquiry is negative, the "No" branch is followed to step 365, wherein the alerts is flagged with a benign determination. The method then proceeds to step 230 of FIG. 2.

Figure 4:
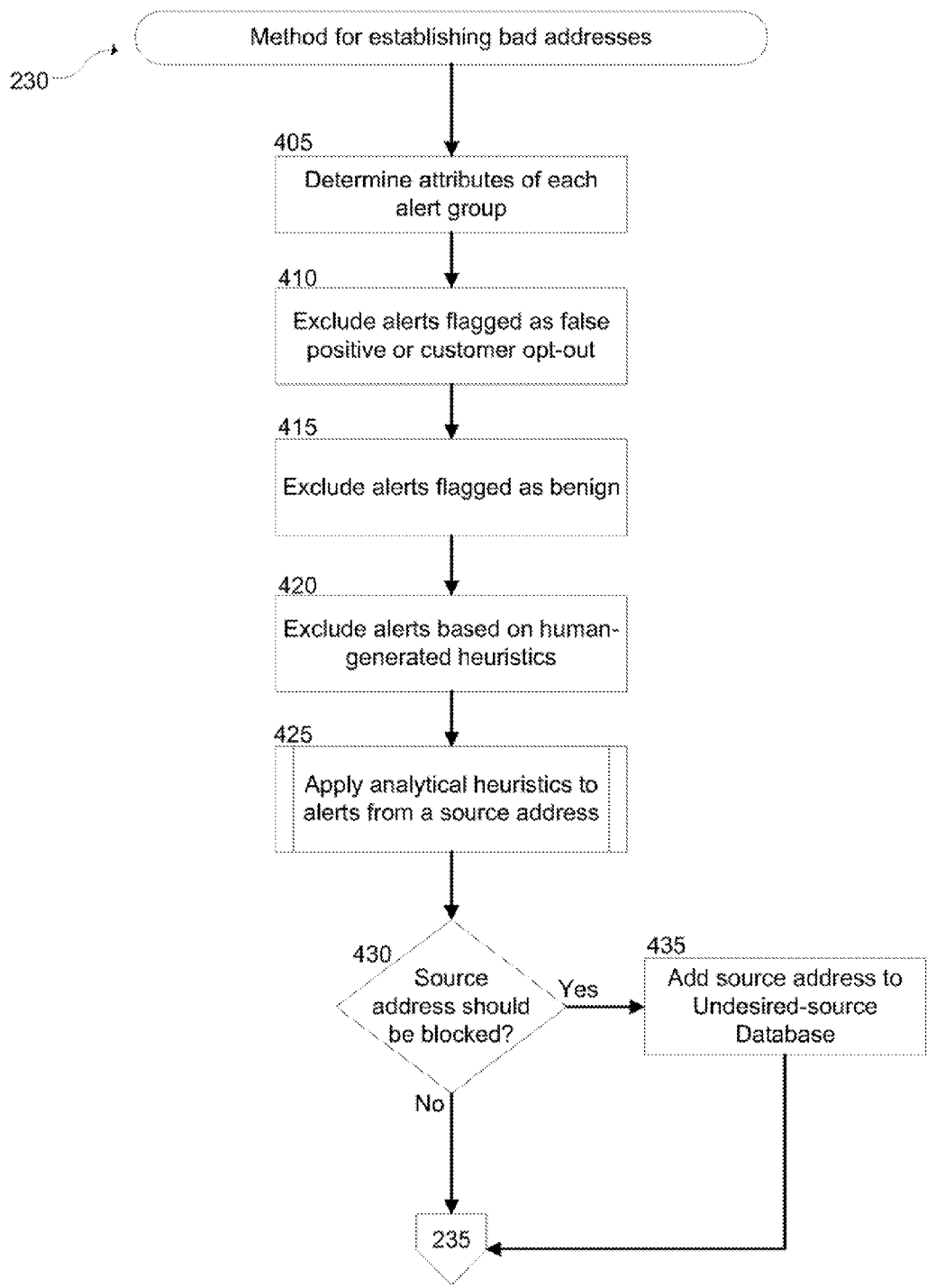
FIG. 4 is a flow chart depicting an exemplary method for establishing bad addresses using the network protection system of FIG. 1.

Referring now to FIG. 4, a method 230 for establishing bad addresses is described. FIG. 4 will be discussed with reference to FIGS. 1 and 2. In step 405, the undesired-source database generation engine 128 determines the attributes of the alert groups associated with the determinations in the determinations database 122. In an exemplary embodiment, the undesired-source database generation engine 128 determines the source address, the number of alerts, the associated signature, and the target of each alert group. In step 410, alerts that are flagged as false positives are excluded from the undesired-source database generation engine's 128 consideration. In step 415, alerts that are flagged as benign are excluded from the undesired-source database generation engine's 128 consideration. In step 420, any alerts that an analyst 116 has determined should be excluded—for example, POP, SMTP, and UDP traffic—from the undesired-source database generation engine's 128 consideration are excluded. In step 425, once all of the alerts that should not result in an IP address being added to an undesired-source database have been excluded from the calculation, analytical heuristics are applied to alerts identified with each source IP address. The method for applying analytical heuristics is described in further detail with respect to FIG. 5.

In decision step 430, it is determined whether a source address has been identified as an address that should be blocked. If the result of the inquiry is positive, the "Yes" branch is followed to step 435, wherein the source address is added to the undesired-source database 130. The method then proceed s to step 235 of FIG. 2. On the other hand, if the result of the inquiry in step 430 is negative, the "No" branch is followed to step 235 of FIG. 2.

Figure 5:
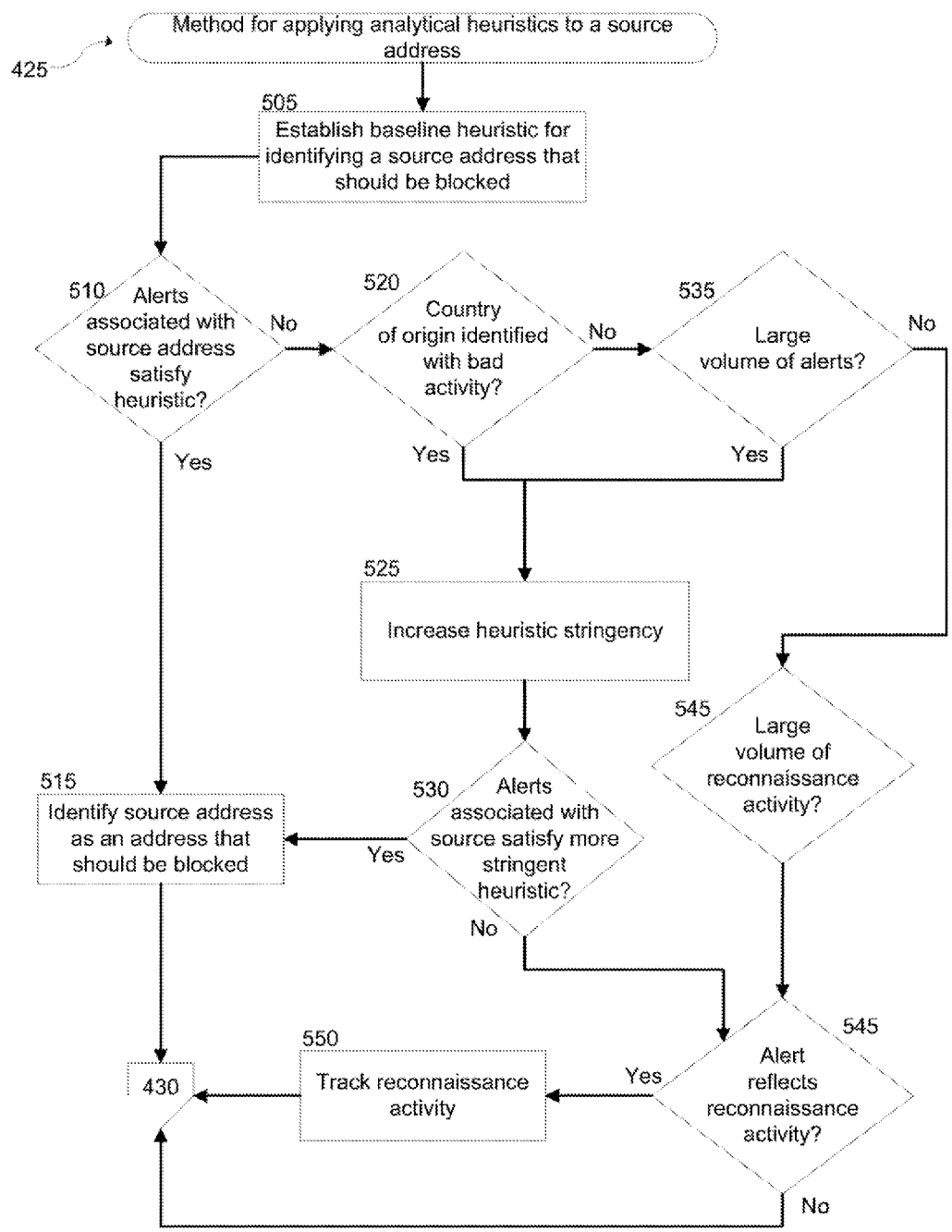
FIG. 5 is a flow chart depicting an exemplary method for applying analytical heuristics to a source address using the network protection system of FIG. 1.

Referring now to FIG. 5, a method 425 for applying analytical heuristics to a 0 source address is described. FIG. 5 will be discussed with reference to FIGS. 1 and 4. In step 505, a baseline heuristic is established that may be used to identify a source address that should be blocked. In decision step 510, it is determined whether the attributes of the alerts identified with a particular source address satisfy the heuristic. If the result of inquiry is positive, the "Yes" branch is followed to step 515, wherein the source address is identified as an address that should be blocked. The method then proceeds to step 430 of FIG. 4.

Referring again to decision step 510, if it is determined that the alerts identified with a source address do not satisfy the heuristic, the "No" branch is followed to decision step 520. In decision step 520, it is determined whether the country associated with the source address is identified as a common source of undesirable internet traffic. If the result of inquiry is negative the "No" branch is followed to decision step 535, wherein it is determined whether the number of alerts that are associated with that source address exceed a predetermined number of alerts that have been determined to be indicative of a source address that should be blocked. By way of example only, one-hundred alerts may result in an affirmative result in decision step 535. If the result of the inquiry is negative, the "No" branch is followed to decision step 540, wherein it is determined whether the number of alerts that arc indicative of reconnaissance activity associated with the source address exceeds a predetermined amount. By way of example only, more than five reconnaissance alerts from a source address may result in an affirmative result in decision step 540. If the inquiry in any of steps 520, 535, or 540 is affirmative, the "Yes" branch from the respective decision step is followed to step 525, wherein the stringency of the baseline heuristic is increased such that fewer alerts may result in addition of the source address to the undesired-source database 130.

The method then proceeds to decision step 530, wherein it is determined whether the alerts associated with the source address satisfy the more stringent heuristic. If the result of the inquiry is positive, the "Yes" branch is followed to step 515, wherein the source address is identified as an address that should be blocked. The method then proceed s to step 430 of FIG. 4. Referring again to decision step 530, if it is determined that the alerts associated with the source address do not satisfy the more stringent heuristic, the "No" branch is followed to decision step 545.

Referring again to decision step 540, wherein it is determined whether the source IP is associated with a large volume of reconnaissance activity, if the result of the inquiry is negative, the "No" branch is followed to decision step 545, wherein it is determined whether the signatures associated with the alert reflect reconnaissance activity. If the result of the inquiry is positive, the "Yes" branch is followed to step 550, wherein the reconnaissance activity is tracked. In an exemplary embodiment, tracking reconnaissance activity consists of counting each alert flagged as indicative of reconnaissance activity. The method then proceeds to step 430 of FIG. 4. Referring again to decision step 545, if the alert does not reflect reconnaissance activity, the "No" branch is followed to step 430 of FIG. 4.

Figure 6:
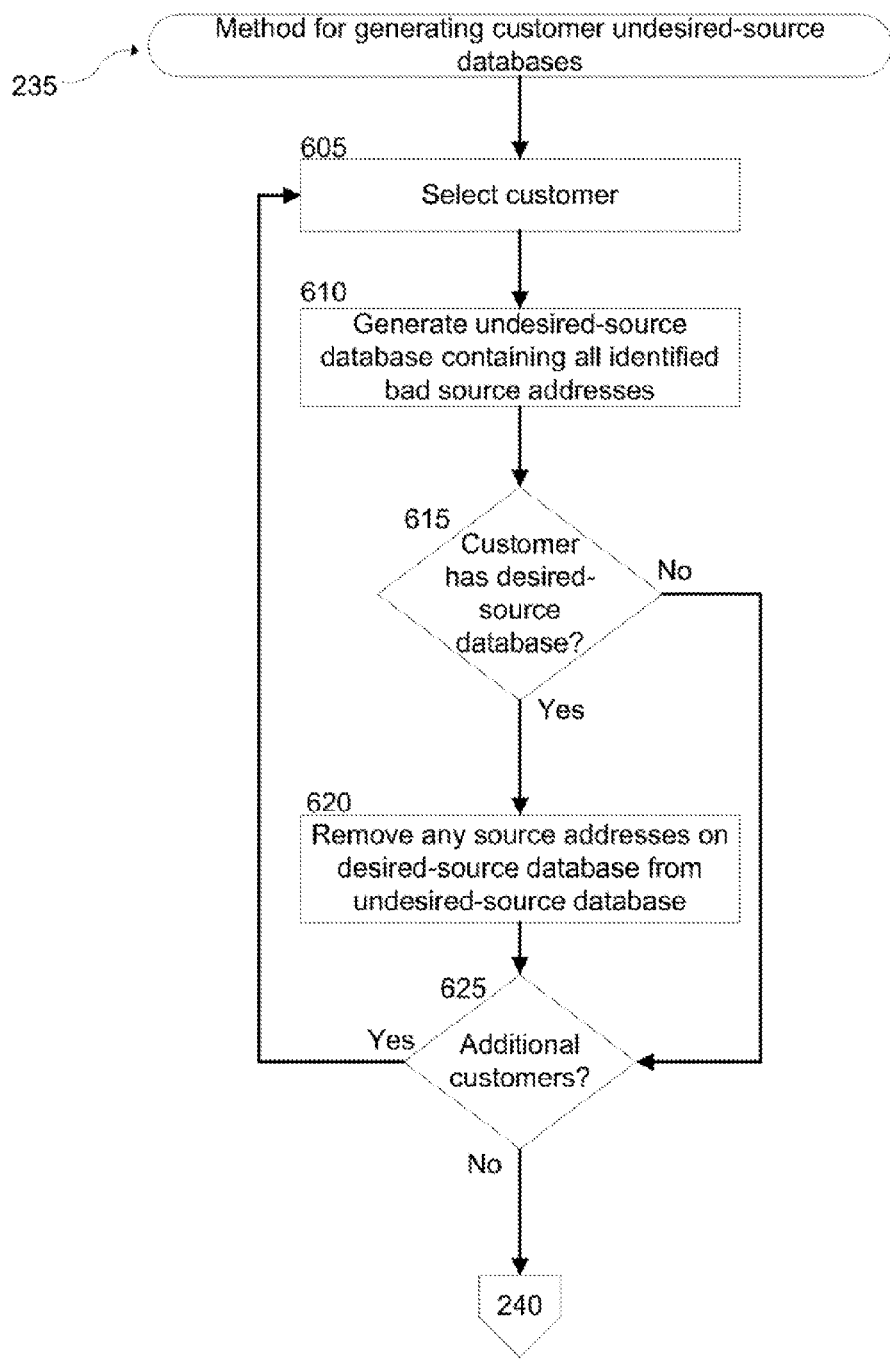
FIG. 6 is a flow chart depicting an exemplary method for generating customer undesired-source databases using the network protection system of FIG. 1.

Referring now to FIG. 6, a method 235 for generating customer undesired-source databases is described. The method 235 will be described with reference to FIGS. 1 and 2. In step 605, a customer 104 is selected for whom an undesired-source database will be generated. In step 610, a undesired-source database is generated for the selected customer 104 containing all of the source addresses stored in the undesired-source database 130. In decision step 615, it is determined whether the customer 104 has set up a desired-source database of source addresses that should always be allowed to pass into the customer's protected network 112. If the inquiry in decision step 615 is positive, the "Yes" branch is followed to step 620, wherein any source addresses appearing on the desired-source database are removed from the customer's undesired-source database. Referring again to decision step 615, if the customer 104 does not have a desired-source database, the "No" branch is followed to decision step 625.

In decision step 625, it is determined whether the undesired-source database 130 should be sent to additional customers 104. If the result of the inquiry in step 625 is positive, the "Yes" branch is followed to step 605, wherein further customers 104 are selected. If the result of the inquiry in step 625 is negative, the "No" branch is followed, and the method proceeds to step 240 of FIG. 2.

Figure 7:
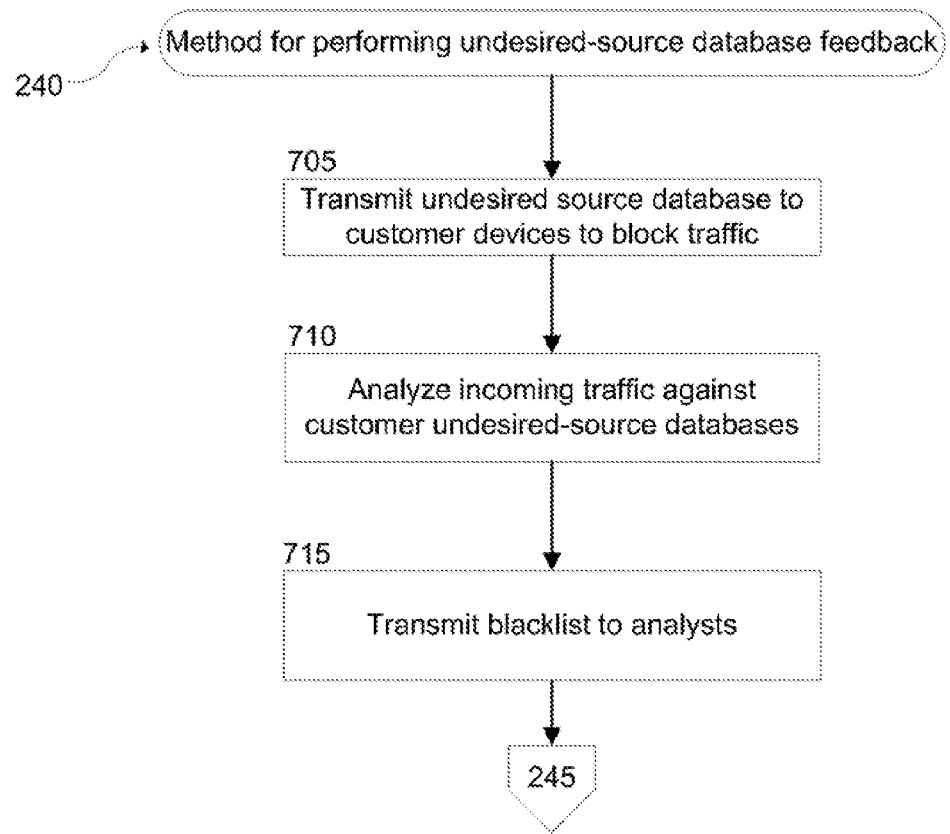
FIG. 7 is a flow chart depicting an exemplary method for performing undesired-source database feedback using the network protection system of FIG. 1.

Referring now to FIG. 7, a method 240 for performing undesired-source database feedback is described. FIG. 7 will be described with respect to FIGS. 1 and 2. In step 705, customer undesired-source databases are transmitted to customer devices, such as firewalls, wherein the customer devices can then be configured to block traffic received from addresses in the undesired-source database. In step 710, traffic from the internet 102 is blocked if it originates from an address on the undesired-source database. In step 715, the undesired-source database is transmitted to analysts at the signature generation facility 110 and the alert analysis facility 114 so that the analysts may create and refine rules based on the IP addresses on the undesired-source database. Specifically, the analysts can use the undesired-source database as a tool to help further investigate and identify potential attacks. Because the addresses in the undesired-source database 130 are known bad actors on the internet 102, an analyst 116 can specifically track and analyze activity generated by the address in the undesired-source database 130 to look for further attack signatures.

Alternative embodiments of the system and method for identification and blocking of unwanted network traffic will become apparent to one of ordinary skill in the art to which the present invention pertains without departing from its spirit and scope. Thus, although this invention has been described in exemplary form with a certain degree of particularity, it should be understood that the present disclosure has been made only by way of example and that numerous changes in the details of construction and the combination and arrangement of parts or steps may be resorted to without departing from the spirit or scope of the invention. Accordingly, the scope of the present invention is defined by the appended claims rather than the foregoing description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving at a network protection system an alert from an intrusion detection system associated with a protected network, wherein the alert is triggered by network traffic that is evaluated by the intrusion detection system and that is determined to match a signature that is associated with undesired network behavior;
   determining a source of the network traffic that triggered the alert;
   grouping at the network protection system the alert into an alert group;
   assigning a determination to the alert group, the determination indicating a threat level associated with the alert group;
   generating an entry in an undesired source database based on the alert group, the entry including a first Internet Protocol (IP) address associated with the alert; and
   providing the undesired source database to the intrusion detection system, such that the intrusion detection system is configured to block network traffic that originates from the first IP address.

2. The method of claim 1, wherein generating the entry further comprises:
   determining that a second IP address associated with a second alert is a spoofed IP address; and
   disregarding the second IP address from the undesired source database in response to determining that the second IP address is a spoofed IP address.

3. The method of claim 1, wherein generating the entry further comprises:
   determining that traffic associated with a second alert is a Universal Datagram Protocol (UDP) traffic; and
   disregarding a second IP address associated with the second alert in response to determining that the traffic UDP traffic.

4. The method of claim 1, wherein generating the entry further comprises:
   determining that the first IP address is associated with a geolocation, wherein the first IP address is included in the entry in response to determining that the first IP address is associated with the geolocation.

5. The method of claim 1, wherein generating the entry further comprises:
   determining that the alert group includes more than a predetermined number of reconnaissance activities; and
   determining that the first IP address is associated with a reconnaissance activity, wherein the first IP address in included in the entry in response to determining that the alert group includes more than the predetermined number of reconnaissance activities.

6. The method of claim 1, wherein generating the entry further comprises:
   determining that the alert group includes more than a predetermined number of alerts from matched signatures received by a predetermined number of target devices in a predetermined period of time.

7. The method of claim 6, further comprising:
   determining that the generating of the entry resulted in an excess number of entries in the undesired source database; and
   increasing at least one of the predetermined number of alerts, the predetermined number of target devices, and the predetermined period of time.

8. The method of claim 6, further comprising:
   determining that the undesired source database includes an insufficient number of entries; and
   decreasing at least one of the predetermined number of alerts, the predetermined number of target devices, and the predetermined period of time.

9. A non-transitory computer-readable medium encoded with computer-executable instructions for performing a method, the method comprising:
   receiving at a network protection system an alert from an intrusion detection system associated with a protected network, wherein the alert is triggered by network traffic that is evaluated by the intrusion detection system and that is determined to match a signature that is associated with undesired network behavior;
   determining a source of the network traffic that triggered the alert;

grouping at the network protection system the alert into an alert group;

assigning a determination to the alert group, the determination indicating a threat level associated with the alert group;

generating an entry in an undesired source database based on the alert group, the entry including a first Internet Protocol (IP) address associated with the alert; and providing the undesired source database to the intrusion detection system, such that the intrusion detection system is configured to block network traffic that originates from the first IP address.

10. The computer-readable medium of claim 9, wherein, in generating the entry, the method further comprises:

determining that a second IP address associated with a second alert is a spoofed IP address; and disregarding the second IP address from the undesired source database in response to determining that the second IP address is a spoofed IP address.

11. The computer-readable medium of claim 9, wherein, in generating the entry, the method further comprises:

determining that traffic associated with a second alert is a Universal Datagram Protocol (UDP) traffic; and disregarding a second IP address associated with the second alert in response to determining that the traffic UDP traffic.

12. The computer-readable medium of claim 9, wherein, in generating the entry, the method further comprises:

determining that the first IP address is associated with a geolocation, wherein the first IP address is included in the entry in response to determining that the first IP address is associated with the geolocation.

13. The computer-readable medium of claim 9, wherein, in generating the entry, the method further comprises:

determining that the alert group includes more than a predetermined number of reconnaissance activities; and determining that the first IP address is associated with a reconnaissance activity, wherein the first IP address in included in the entry in response to determining that the alert group includes more than the predetermined number of reconnaissance activities.

14. The computer-readable medium of claim 9, wherein, in generating the entry, the method further comprises:

determining that the alert group includes more than a predetermined number of alerts from matched signatures received by a predetermined number of target devices in a predetermined period of time.

15. The computer-readable medium of claim 14, the method further comprising:

determining that the generating of the entry resulted in an excess number of entries in the undesired source database; and increasing at least one of the predetermined number of alerts, the predetermined number of target devices, and the predetermined period of time.

16. The computer-readable medium of claim 14, the method further comprising:

determining that the undesired source database includes an insufficient number of entries; and decreasing at least one of the predetermined number of alerts, the predetermined number of target devices, and the predetermined period of time.

* * * * *